United States Patent Office 3,546,216
Patented Dec. 8, 1970

3,546,216
SCHIFF BASES OF AMINO-SUBSTITUTED
TETRAHYDROTHIOPHENE 1,1-DIOXIDES
Howard E. Dunn, Bartlesville, Okla., assignor to Phillips
Petroleum Company, a corporation of Delaware
No Drawing. Filed Mar. 21, 1967, Ser. No. 624,693
Int. Cl. C07d 63/02
U.S. Cl. 260—240        2 Claims

ABSTRACT OF THE DISCLOSURE

Amino-substituted tetrahydrothiophene 1,1-dioxides are reacted with aldehydes to produce Schiff bases.

Schiff bases, methods of making the same and uses therefor are known in the art and have found numerous varied applications. The novel Schiff bases produced by the process of this invention have unexpected advantages in numerous applications and are particularly useful as antioxidants for materials such as lubricating oils, greases, and polymer compositions.

It is therefore one object of this invention to provide novel compounds having substantial utility. It is another object of this invention to provide novel Schiff bases of amino-substituted tetrahydrothiophene 1,1-dioxides. It is yet another object of this invention to provide a method for producing novel Schiff bases. It is another object of this invention to provide a method for producing Schiff bases of amino-substituted tetrahydrothiophene 1,1-dioxides.

In accordance with this invention, a Schiff base of an amino-substituted tetrahydrothiophene 1,1-dioxide is produced by contacting an amino-substituted tetrahydrothiophene 1,1-dioxide with an aldehyde having an unsubstituted or hydrocarbyl-substituted aryl, furyl, or thienyl radical attached to the formyl group.

Amino-substituted tetrahydrothiophene 1,1-dioxides applicable for use in the process of this invention can be represented by the formula

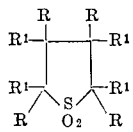

where each R is selected from the group consisting of hydrogen and alkyl, cycloalkyl, and aryl radicals and combinations thereof such as alkaryl radicals, aralkyl radicals, and the like, and each $R^1$ is selected from the group consisting of the amino radical and R, at least one and not more than two $R^1$ groups being amino, the total number of carbon atoms in the molecule not exceeding about 18. The amino-substituted tetrahydrothiophene 1,1-dioxides can be employed as the free amines, or they can be employed in salt form and converted in situ to the free amines by treatment with a base.

Examples of some amino-substituted tetrahydrothiophene 1,1-dioxides which can be used in the process of the invention include:

tetrahydro-2-thiophenine 1,1-dioxide
tetrahydro-3-thiophenine 1,1-dioxide
tetrahydro-3-methyl-2-thiophenine 1,1-dioxide
tetrahydro-2-ethyl-3-thiophenine 1,1-dioxide
tetrahydro-4-isopropyl-2-thiophenine 1,1-dioxide
tetrahydro-2-methyl-5-butyl-3-thiophenine 1,1-dioxide,
tetrahydro-2,3,4,5-tetramethyl-3-thiophenine 1,1-dioxide
tetrahydro-3,3-dimethyl-4-hexyl-2-thiophenine 1,1-dioxide
tetrahydro-4-(2-ethyloctyl)-3-thiophenine 1,1-dioxide
tetrahydro-5-tetradecyl-2-thiophenine 1,1-dioxide
tetrahydro-2-cyclohexyl-3-thiophenine 1,1-dioxide
tetrahydro-3-(3-methylcyclopentyl)-2-thiophenine
 1,1-dioxide
tetrahydro-2-ethyl-5-(cyclohexylmethyl)-3-thiophenine
 1,1-dioxide
tetrahydro-4-phenyl-3-thiophenine 1,1-dioxide
tetrahydro-5-p-tolyl-2-thiophenine 1,1-dioxide
tetrahydro-2-benzyl-3-thiophenine 1,1-dioxide
tetrhydro-3,4-thiophenediamine 1,1-dioxide
tetrahydro-2,3-thiophenediamine 1,1-dioxide
tetrahydro-2-methyl-3,4-thiophenediamine 1,1-dioxide
tetrahydro-3-cyclophenyl-2,5-thiophenediamine
 1,1-dioxide, and
tetrahydro-5-phenyl-2,3-thiophenediamine 1,1-dioxide.

Aldehydes applicable in the process of this invention can be represented by the formula $R^2CHO$, where R is selected from the group consisting of unsubstituted and substituted aryl, 2-fury, 3-furyl, 2-thienyl, and 3-thienyl radicals, the substituents in said substituted radicals being selected from alkyl, cycloalkyl, and aryl radicals, and combinations thereof such as alkaryl radicals, aralkyl radicals, and the like, the total number of carbon atoms in the molecule preferably not exceeding about 18. If desired, mixture of aldehydes can be employed.

Examples of some aldehydes which can be used in the process of the invention include:

benzaldehyde
o-tolualdehyde
p-tolualdehyde
m-ethylbenzaldehyde
3-isopropyl-5-butylbenzaldehyde
p-(2-methylhexy)benzaldehyde
m-undecylbenzaldehyde
o-ocyclhexylbenzaldehyde
m-(cyclopentylmethyl)benzaldehyde
p-(3-methylcyclohexy)-benzaldehyde
1-naphthaldehyde
m-phenylbenzaldehyde
o-benzylbenzaldehyde
p-(m-tolyl)benzaldehyde
2-furaldehyde
3-furaldehyde
5-methyl-2-furaldehyde
2-butyl-3-furaldehyde
3-cyclohexyl-2-furaldehyde
4-phenyl-3-furaldehyde
4-benzyl-2-furaldehyde
5-(o-tolyl)-3-furaldehyde
2-thiophenecarboxaldehyde
3-thiophenecarboxaldehyde
4-ethyl-2-thiophenecarboxaldehyde
2-hexyl-3-thiophenecarboxaldehyde
5-cyclohexyl-2-thiophenecarboxyaldehyde
4-phenyl-3-thiophenecarboxaldehyde, and
3-benzyl-2-thiophenecarboxaldehyde.

The Schiff bases produced in the process of this invention can be represented by the formula

where each $R^3$ is selected from the group consisting of $R^2CH=N-$ and R, at least one and not more than two $R^3$ groups being $R^2CH=N-$, each R and $R^2$ being as defined above. The $R^2CH=N-$ radical or radicals are attached to the same carbon atom or atoms to which the amino radical or radicals were attached in the amino-substituted tetrahydrothiophene 1,1-dioxide used as a reactant.

Examples of some Schiff bases which can be produced in the process of the invention include:

N-benzylidenetetrahydro-3-thiophenine 1,1-dioxide
N-(o-methylbenzylidene)tetrahydro-3-methyl-2-thiophenine 1,1-dioxide
N-(p-methylbenzylidene)tetrahydro-2-cyclohexyl-3-thiophenine 1,1-dioxide
N-(m-ethylbenzylidene)tetrahydro-4-phenyl-3-thiophenine 1,1-dioxide
N-(3-isopropyl-5-butylbenzylidene)tetrahydro-2-thiophenine 1,1-dioxide
N-[p-(2-methylhexyl)benzylidene]tetrahydro-4-isopropyl-2-thiophenine 1,1-dioxide
N-(m-undecylbenzylidene)tetrahydro-5-tetradecyl-2-thiophenine 1,1-dioxide
N-(o-cyclohexylbenzylidene)tetrahydro-2,3,4,5-tetramethyl-3-thiophenine 1,1-dioxide
N-[m-(cyclopentylmethyl)benzylidene]tetrahydro-3,3-dimethyl-4-hexyl-2-thiophenine 1,1-dioxide
N-[p-(3-methylcyclohexyl)benzylidene]tetrahydro-4-(2-ethyloctyl)-3-thiophenine 1,1-dioxide
N-(2-naphthylmethylene)tetrahydro-3-(3-methylcyclopentyl)-2-thiophenine 1,1-dioxide
N-(m-phenylbenzylidene)tetrahydro-2-ethyl-5-(cyclohexylmethyl)-3-thiophenine 1,1-dioxide
N-(o-benzylbenzylidene)tetrahydro-5-p-tolyl-2-thiophenine 1,1-dioxide
N-[p-(m-tolyl)benzylidene]tetrahydro-2-benzyl-3-thiophenine 1,1-dioxide
N-furfurylidenetetrahydro-3-thiophenine 1,1-dioxide
N-(5-methylfurfurylidene)tetrahydro-2-ethyl-3-thiophenine 1,1-dioxide
N-(3-cyclohexylfurfurylidene)tetrahydro-5-phenyl-2-thiophenine 1,1-dioxide
N-(4-benzylfurfurylidene)tetrahydro-3-cyclohexyl-2-thiophenine 1,1-dioxide
N-(3-furylmethylene)tetrahydro-2-thiophenine 1,1-dioxide
N-(2-butyl-3-furylmethylene)tetrahydro-2-methyl-5-butyl-3-thiophenine 1,1-dioxide
N-(4-phenyl-3-furylmethylene)tetrahydro-2-phenyl-3-thiophenine 1,1-dioxide
N-[5-(o-tolyl)-3-furylmethylene]tetrahydro-3-cyclopentyl-2-thiophenine 1,1-dioxide
N-(2-thenylidene)tetrahydro-3-thiophenine 1,1-dioxide
N-(3-thenylidene)tetrahydro-2-thiophenine 1,1-dioxide
N-(4-ethyl-2-thenylidene)tetrahydro-2-cyclohexyl-3-thiophenine 1,1-dioxide
N-(2-hexyl-3-thenylidene)tetrahydro-5-p-tolyl-2-thiophenine 1,1-dioxide
N-(5-cyclohexyl-2-thenylidene)tetrahydro-4-phenyl-3-thiophenine 1,1-dioxide
N-(4-phenyl-3-thenylidene)tetrahydro-2-thiophenine 1,1-dioxide
N-(3-benzyl-2-thenylidene)tetrahydro-3-thiophenine 1,1-dioxide
N,N'-dibenzylidenetetrahydro-3,4-thiophenediamine 1,1-dioxide
N,N'-difurfurylidenetetrahydro-2,3-thiophenediamine 1,1-dioxide
N,N'-bis(3-furylmethylene)tetrahydro-2-methyl-3,4-thiophenediamine 1,1-dioxide
N,N'-bis(2-thenylidene)tetrahydro-3-cyclopentyl-2,5-thiophenediamine 1,1-dioxide, and
N,N'-bis(3-thenylidene)tetrahydro-5-phenyl-2,3-thiophenediamine 1,1-dioxide.

The mole ratio of amino-substituted tetrahydrothiophene 1,1-dioxide to aldehyde can vary over a wide range, usually being within the range of about 0.2:1 to about 2:1, preferably about 1:1, when monoamino-substituted tetrahydrothiophene 1,1-dioxides are employed, and usually being within the range of about 0.2:1 to about 0.6:1, preferably about 0.5:1, when diamino-substituted tetrahydrothiophene 1,1-dioxides are employed. The amino-substituted tetrahydrothiophene 1,1-dioxide can be employed as the free base or in the form of its salt with an inorganic or organic acid. Thus, the amino-substituted tetrahydrothiophene 1,1-dioxide can be used, e.g., as the hydrofluoride, hydrochloride, hydrobromide, hydroiodide, sulfate, phosphate, nitrate, acetate, butyrate, benzoate, and the like. When the amino-substituted tetrahydrothiophene 1,1-dioxide is employed in the form of a salt, the free amine is conveniently liberated by the addition of a base, e.g., by the addition of a hydroxide, oxide, or carbonate of lithium, sodium, potassium, rubidium, cesium, magnesium, calcium, strontium, or barium, the base preferably being added in an amount approximately equal to that theoretically required to liberate the free amino-substituted tetrahydrothiophene 1,1-dioxide from the salt thereof.

Although the reaction temperature can vary over a broad range, it will generally be within the range of about 0–250° C., usually being within the range of about 20–150° C. The reaction time can vary considerably, depending in part on the reaction temperature, but will generally be within the range of about 30 seconds to about 24 hours, usually being within the range of about 5 minutes to about 12 hours. Although higher or lower pressures can be employed, the reaction is usually most conveniently carried out at atmospheric pressure. If desired, a solvent can be employed. Examples of some suitable solvents include water; hydrocarbons such as benzene, toluene, xylenes, hexane, octane, decane, cyclohexane, methylcyclopentane, and cyclodecane; alcohols such as methanol, ethanol, 1-propanol, 2-propanol, 1-butanol, and cyclohexanol; and ethers such as dibutyl ether, tetrahydrofuran, dioxane, ethyl ether of ethylene glycol, and dimethyl ether of diethylene glycol. When a solvent such as benzene is employed which forms an azeotrope with water, the water produced in the process can be conveniently removed by azeotropic distillation.

The Schiff bases produced by the process of this invention can be isolated from the reaction mixture by conventional procedures such as crystallization, extraction, and the like.

The Schiff bases produced in the process of this invention are especially useful as antioxidants, e.g., in lubricating oils, including internal combustion engine, transformer, turbine, and cable oils; in lubricating greases; and in polymer compositions, including polyolefins such as polyethylene, polypropylene, and olefin copolymers, polyamides, polyureas, and the like.

EXAMPLE I

To a stirred mixture of 17.2 g. (0.10 mole) of 3-aminosulfolane hydrochloride (hydrochloride of tetrahydro-3-thiophenine 1,1-dioxide), 10.6 g. (0.10 mole) of benzaldehyde, and 100 ml. of water was added an aqueous 10 weight percent solution of sodium hydroxide until the pH of the resulting mixture reached a value of 6. The mixture was then stirred at about 90° C. for 15 minutes. From the cooled reaction mixture was filtered 18 g. of white crystals, representing an 81 percent crude yield of N-benzylidenetetrahydro-3-thiophene 1,1-dioxide ($C_{11}H_{13}NO_2S$). An analytically pure sample of the product melting at 125–126° C. was obtained by three recrystallizations of the crude product from methanol. The infrared spectrum of the purified product was consistent with that to be expected for a compound of the assigned structure. Elemental analysis and molecular weight determination gave values in good agreement with the calculated values.

*Analysis.*—Calcd. for $C_{11}H_{13}NO_2S$ (percent): C, 59.2; H, 5.9; N, 6.3; mol. wt., 223. Found (percent): C, 59.3; H, 6.0; N, 6.1; mol. wt. (by osmometry), 210.

EXAMPLE II

To demonstrate the utility of the product of Example I as an antioxidant, a mixture of 0.50 g. of white mineral oil and 1.5 mg. of N-benzylidenetetrahydro3-thiophenine 1,1-dioxide was heated at about 250° C. for 10 minutes in air at atmospheric pressure. In a control run 0.50 g. of white mineral oil was heated under the same conditions except that no N-benzylidenetetrahydro-3-thiophenine 1,1-dioxide was employed. For each of the resulting samples, the ratio of the infrared absorbance at 5.9 microns, a wavelength characteristic of the >C=O group, to the infrared absorbance at 6.9 microns, a wavelength characteristic for the

group, was then determined, thereby providing a measure of the extent of oxidation of the mineral oil. For the mineral oil containing the N-benzylidenetetrahydro-3-thiophenine 1,1-dioxide, this absorbance ratio was 0.071. In contrast, this absorbance ratio was found to be 0.13 for the mineral oil sample heated without antioxidant. For the mineral oil alone prior to heating this absorbance ratio was 0.00.

Thus, N-benzylidenetetrahydro-3-thiophenine 1,1-dioxide was effective in reducing substantially the extent of oxidation suffered by the mineral oil.

EXAMPLE III

To a 50-ml. flask equipped with condenser, Dean-Stark water separator, and magnetic stirrer were added 5.00 g. (0.037 mole) of 3-aminosulfolane (tetrahydro-3-thiophenine 1,1-dioxide), 3.55 g. (0.037 mole) of 2-furaldehyde and 25 ml. of benzene. The mixture was then refluxed at atmospheric pressure, with stirring, for 7¼ hours, the water produced being removed by azeotropic distillation. A small amount of carbonaceous material was filtered from the reaction mixture and solvent was evaporatively removed from the filtrate under reduced pressure to give as a residue 7.78 g. of a dark viscous material which subsequently crystallized. This residual product, which represented a 99 percent crude yield of N-furfurylidenetetrahydro-3-thiophenine 1,1-dioxide ($C_9H_{11}NO_3S$), was treated with decolorizing carbon and recrystallized three times from 2-propanol to obtain an analytically pure sample of the product melting at 93–94° C. The nuclear magnetic resonance spectrum of the purified product was consisten with that to be expected for a compound of the assigned structure. Elemental analysis and molecular weight determination gave values in excellent agreement with the calculated values.

*Analysis.*—Calc'd for $C_9H_{11}NO_3S$ (percent): C, 50.7; H, 5.2; N, 6.6; mol. wt., 213. Found (percent): C, 50.7; H, 5.2; N, 6.5; mol. wt. (by mass spectrometry), 213.

EXAMPLE IV

A mixture of 150 ml. of liquid ammonia and 13.9 g. (0.05 mole) of 3,4-dibromosulfolane (tetrahydro-3,4-dibromothiophene 1,1-dioxide) was stirred in an autoclave at 24–27° C. for 18½ hours. Unreacted ammonia was then bled off, and the residual liquid was acidified with 6 N hydrochloric acid. The aqueous acidic mixture was extracted with ether, after which it was made basic with 10 percent sodium hydroxide and again extracted with ether. After evaporation of some of the water from the resulting aqueous solution, to the remaining yellow aqueous solution containing 3,4-diaminosulfolane (tetrahydro-3,4-thiophenediamine 1,1-dioxide) was added 10.6 g. (0.10 mole) of benzaldehyde. The mixture was then heated just to reflux temperature, over a period of about 30 minutes, resulting in the separation of a yellow solid which was filtered to give 17.47 g. of crude product. A portion of this product was recrystallized twice from absolute ethanol to give fine white needles melting at 182–183° C., identified as N,N'-dibenzylidenetetrahydro-3,4-thiophenediamine 1,1-dioxide ($C_{18}H_{18}N_2O_2S$) by elemental analysis, molecular weight determination, and infrared analysis.

*Analysis.*—Calc'd for $C_{18}H_{18}N_2O_2S$ (percent): C, 66.22; H, 5.56; N, 8.58; mol. wt., 326. Found (percent): C, 66.25; H, 5.61; N, 8.43; mol. wt. (by osmometry), 328.

The infrared spectrum of the product was consistent with that to be expected for the assigned structure, a band appearing at 1630 cm.$^{-1}$, characteristic of the >=N— group, with no band indicative of an >N—H or —O—H group.

I claim:

1. A compound of the formula

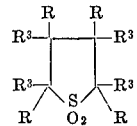

wherein at least one and not more than two of the $R^3$ groups is an $R^2CH=N$— radical and each remaining $R^3$ and R is selected from hydrogen, alkyl of up to 14 carbon atoms, cycloalkyl of up to 6 carbon atoms and phenyl and benzyl radicals, and combinations thereof, wherein each $R^2$ is one of substituted and unsubstituted aryl, 2-furyl, 3-furyl, 2-thienyl and 3-thienyl radicals, the substituents of said last substituted radicals being selected from the group consisting of alkyl, cycloalkyl and aryl radicals, and combinations thereof wherein each $R^2$ does not exceed 18 carbon atoms.

2. The compound of claim 1 selected from the group consisting of N-benzylidenetetrahydro-3-thiophenine 1,1-dioxide, N-furfurylidenetetrahydro-3-thiophenine 1,1-dioxide, and N,N'-dibenzylidenetetrahydro-3,4-thiophenediamine 1,1-dioxide.

References Cited

Beilstein's Handbuch der Organischen Chemie, 4th ed., vol. 18, system No. 2643, p. 578, Julius Springer, Berlin, Germany (1934).

Hartough: "Thiophene and Its Derivatives," p. 230, Interscience Publishers Inc., New York (1952).

JOHN D. RANDOLPH, Primary Examiner

U.S. Cl. X.R.

252—402, 406; 260—332.1